United States Patent Office 3,226,876
Patented Jan. 4, 1966

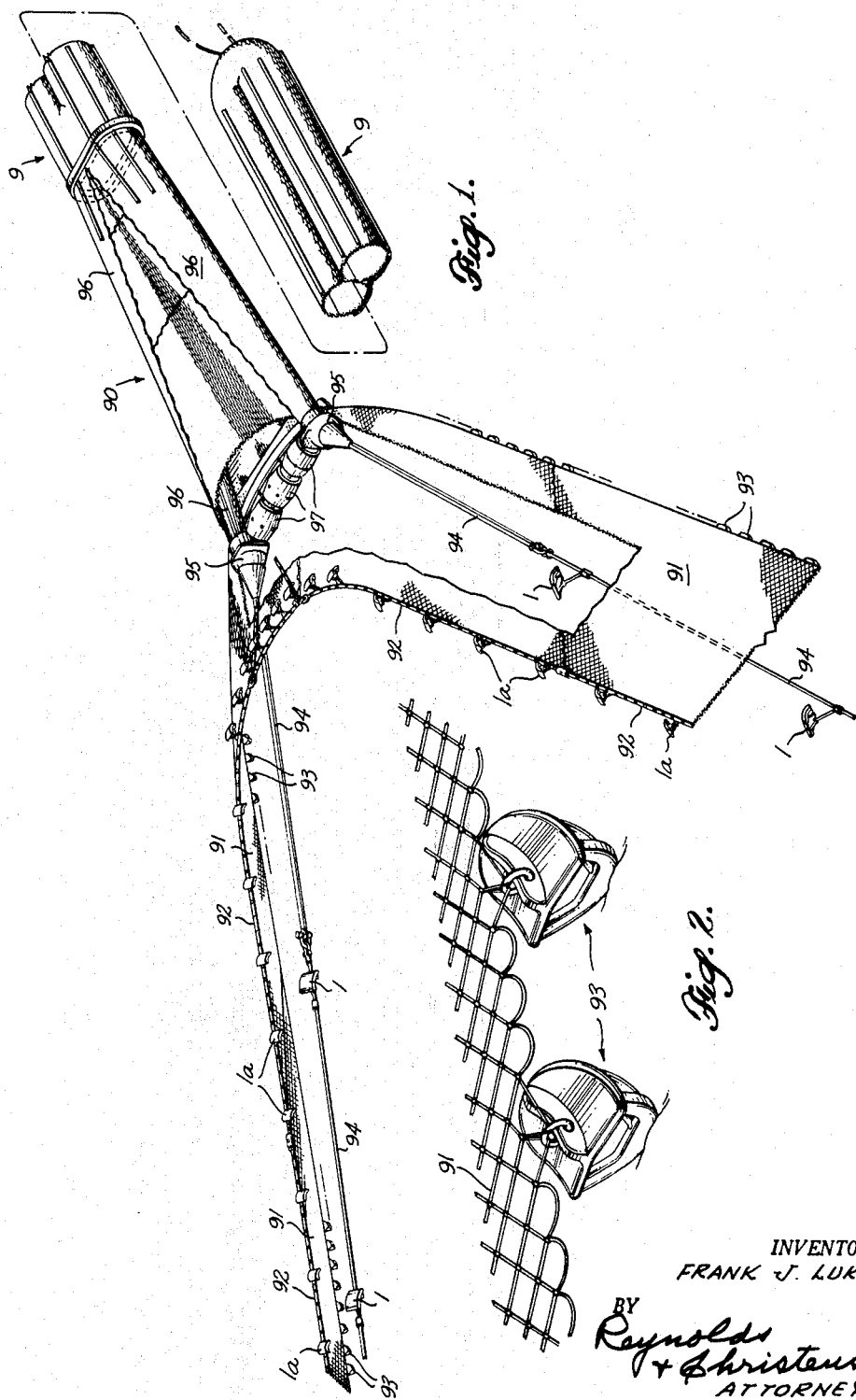

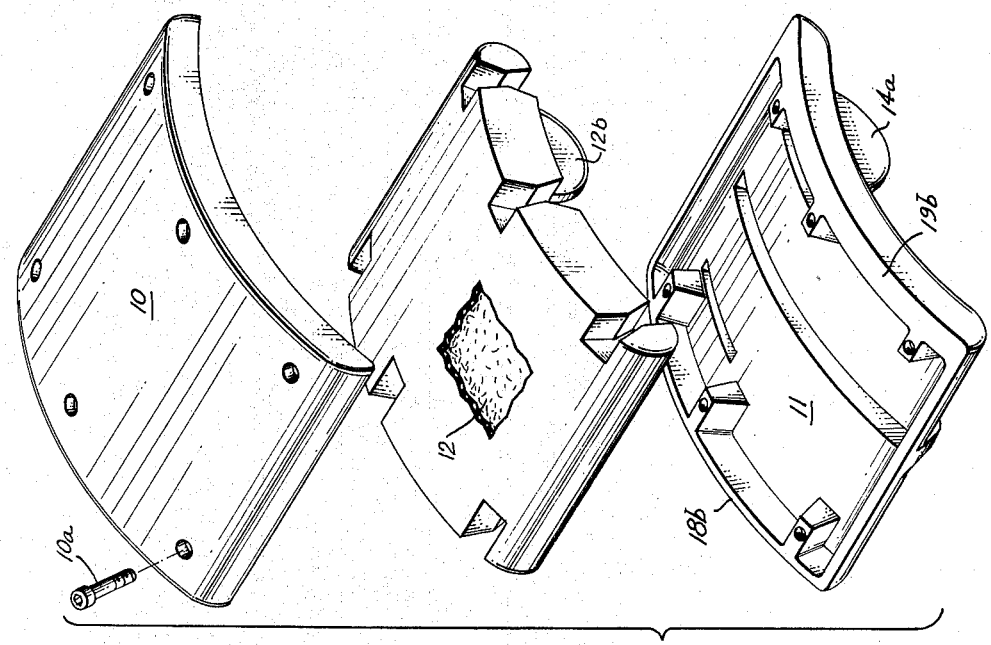
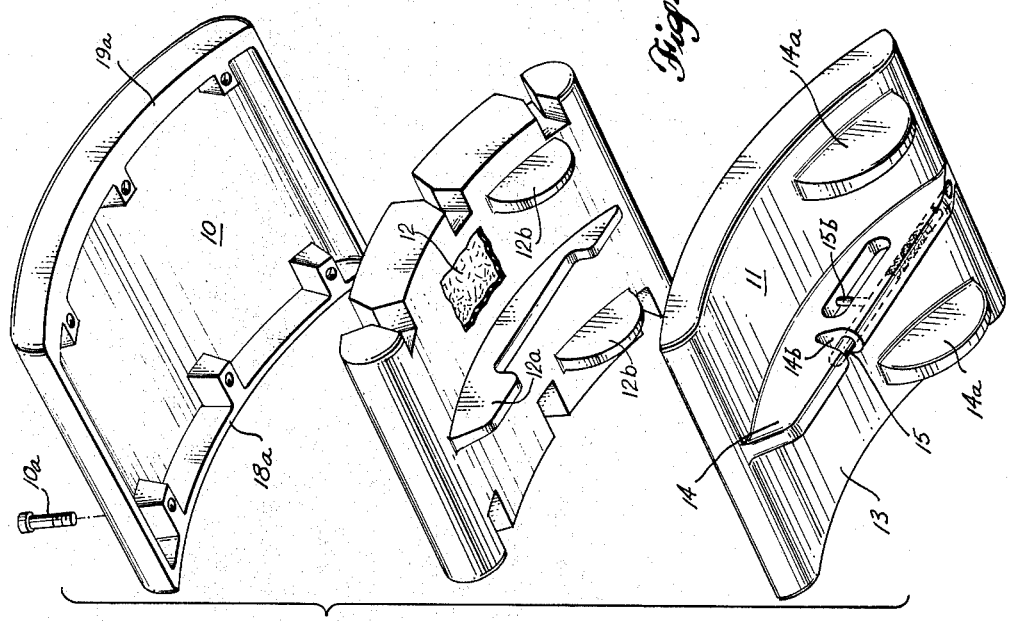

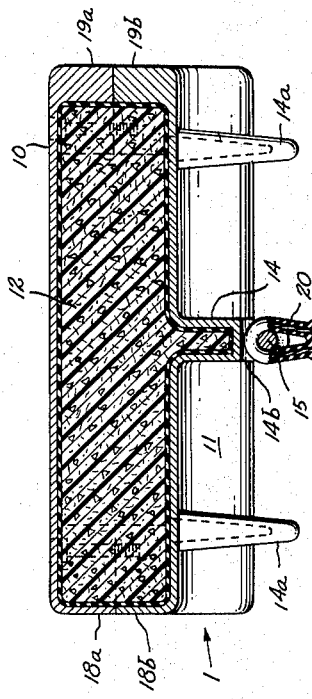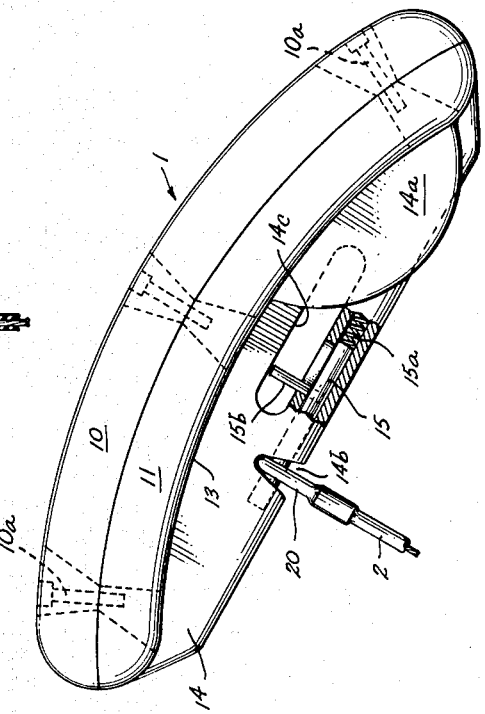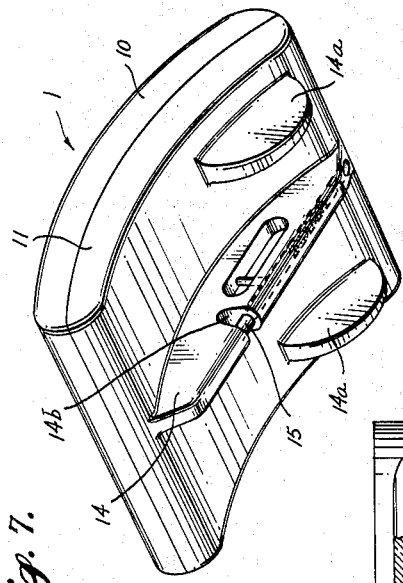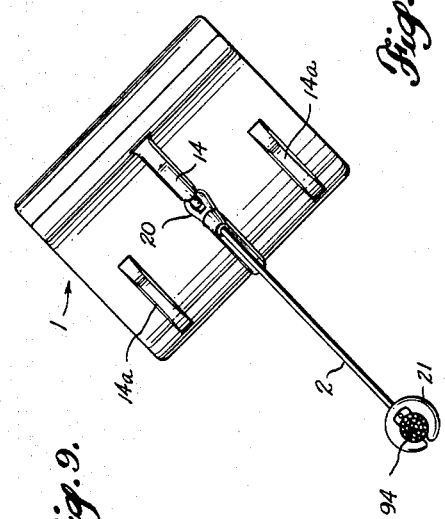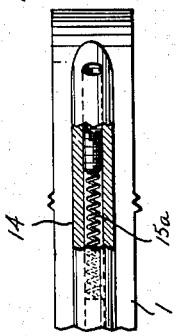

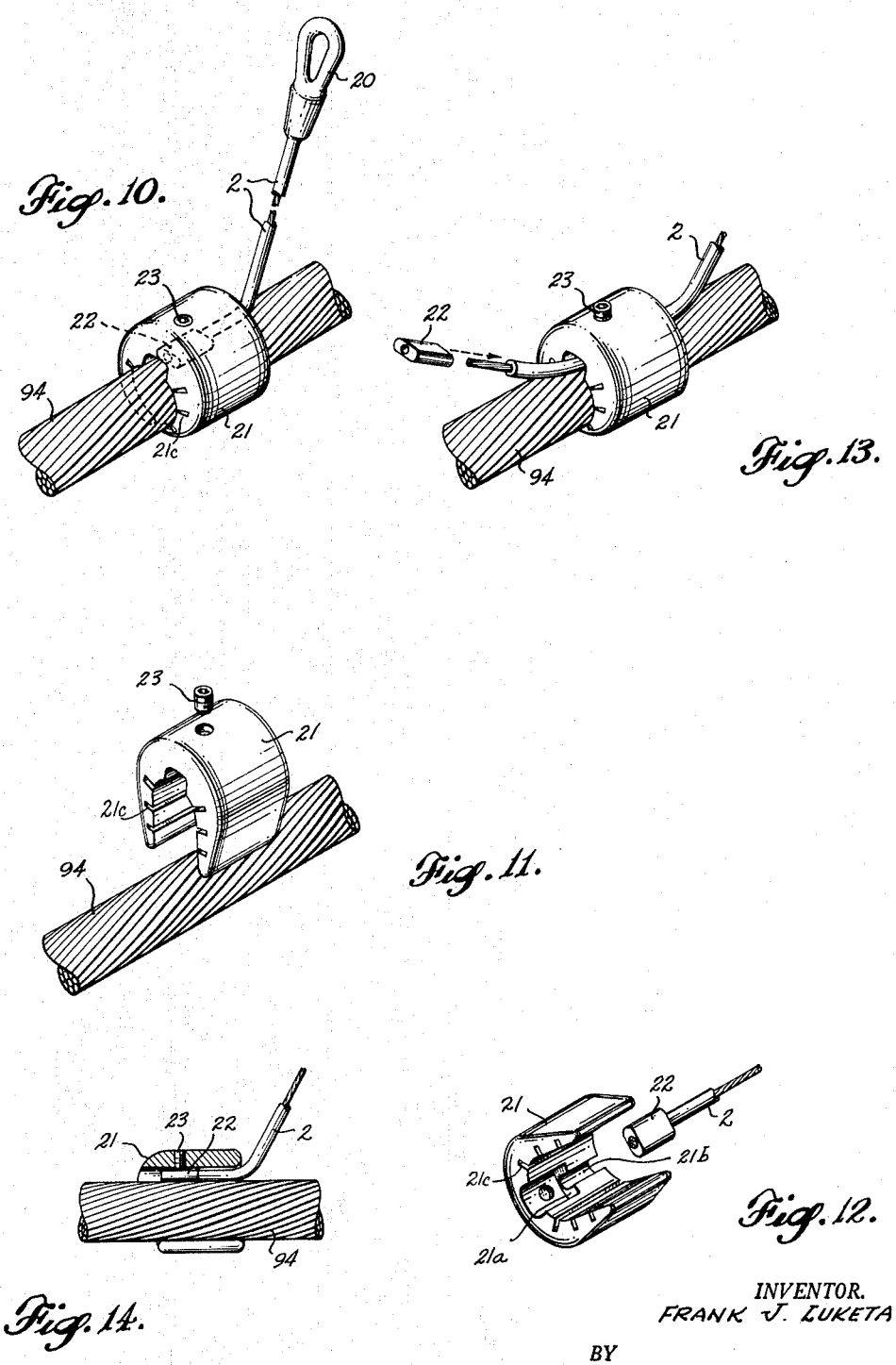

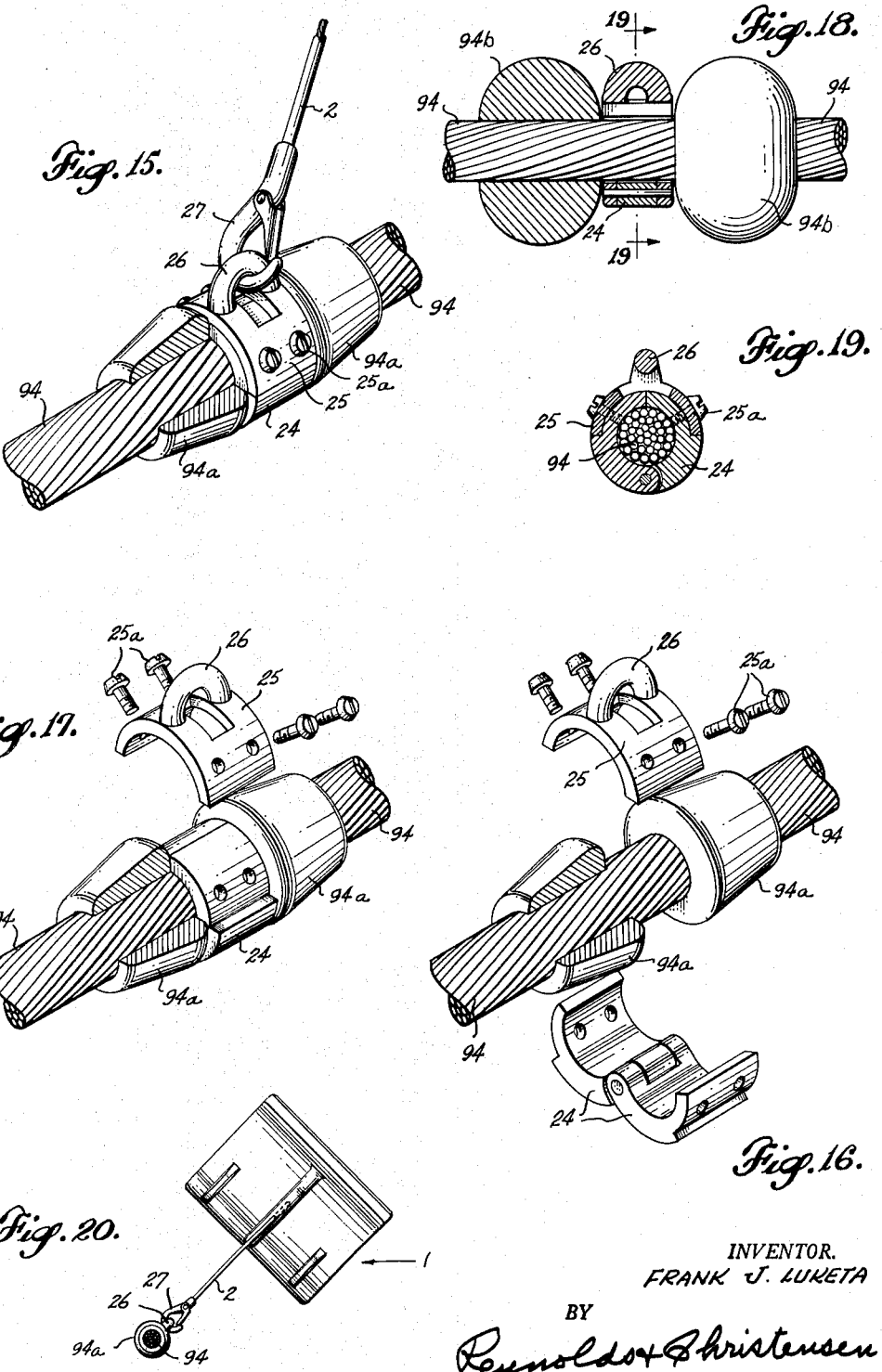

3,226,876
RELEASABLE FLOAT FOR TRAWL NETS
Frank J. Luketa, 5567 Greenwood Ave., Seattle, Wash.
Filed Apr. 9, 1962, Ser. No. 186,084
3 Claims. (Cl. 43—43.1)

The present invention relates to trawl net floats, and more particularly to improvements in trawl net floats of the general type disclosed in my Patent No. 3,013,356, entitled Foats for Trawl Nets, dated December 19, 1961.

Such floats function not so much by reason of their inherent buoyancy, which may be rather slight, as by reason of their water reaction surfaces, and the means to orient such surfaces at all times during use in such manner as to produce a force having a strong upward component, acting upon the line or net element to which the floats are anchored, to buoy up the same. The floats may be also be arranged or formed in a manner to produce a lateral component, in addition to the upward component, by such lateral component to counter a tendency for the buoyed-up net element to lie in a catenary curve during use, as has been explained in my pending application Serial No. 365,233, entitled Catenary Countering Means for Trawl Net Lines, and filed on April 30, 1964, as a continuation-in-part of my now-abandoned application Serial No. 150,577, filed November 6, 1961, and entitled Catenary Countering Trawl Net.

Such floats have been applied to curtain lines of trawl nets, and to sweep lines by which the net is dragged forwardly. If such floats are left attached to these lines, and in particular to the sweep lines by which the net body is hauled on deck, as explained in my application Serial No. 338,256, filed January 18, 1964, entitled Drum Trawling Apparatus and Method (based on abandoned application Serial No. 570,771, filed March 12, 1956), they are quite likely to be severely stressed, perhaps crushed, as floats earlier wrapped about a winch drum are overlaid by the heavily stressed line coming onto the same winch drum. They can be strongly constructed to resist such crushing, but this tends to increase their bulk and weight, thus to decrease their effectiveness as floats. The greatest total of the crushing forces can be realized in nets of large capacity, say many tons of fish, with power equipment available on the trawler to haul in the net and its heavily loaded cod end up a ramp at the vessel's stern, against the resistance of so great a catch.

In addition to the liability to crush the floats, if they are left attached to the lines during hauling in, the floats may become entangled in the net, and are likley to damage the same during hauling or setting.

It is therefore highly desirable, and an object of this invention, to provide a construction whereby the floats can be readily detached from the line or lines which they buoy up, during hauling, and as readily attached again during setting. Thereby the lines can be reeled onto or from their winch drums with no probability of entanglement, and no possibility of crushing the floats.

In the patent and application first referred to above the floats are intended for anchorage at intervals in the length of curtain lines, from which curtains of netting depend, and in the length of sweep lines which take the strain of hauling the loaded cod end, which sweep lines are clear of the netting elements. A way has been found to incorporate buoyancy components in lines such as curtain lines, which are themsleves oriented by the dependent curtains when drawn through the water, and by these built-in components to buoy up the lines, and if required, to produce catenary-countering lateral components. This eliminates the need for attachment of floats to the curtain lines, but since the sweep lines are bare, and so are not oriented by any attached mesh elements, it is not readily feasible to buoy up these sweep lines, nor to counter any catenary tendency in them, by built-in components. The present invention, then relates more particularly to sweep lines and to means for securing floats at intervals in their length, in such manner that these floats can be readily detached during hauling in, and as readily attached during setting, without interruption of either such operation, and further in such manner that the floats will buoy up, and when required will counter any catenary tendency in such lines. At the same time, detachment of the floats during hauling in will protect them from crushing under the circumstances outlined above, and will permit them to be made of minimum bulk and weight.

It is a further object to so construct such floats that, although rather lightly built, they inherently and adequately resist hydrostatic crushing forces at all depths to which they are likely to descend.

It is also an object to make such floats in a mechanically simple form, capable of being opened and taken apart for replacement of any defective or damaged parts.

A further object is to provide in such floats a protected means for quick detachment or attachment of an anchorage line which is secured to the principal line, the sweep line for instance, in the form where such anchorage lines remain attached to the sweep line and the float is detached from the anchorage line.

In another form the anchorage line with the float attached is detached from an anchorage that remains upon the sweep line. The anchorage itself is then subject to crushing by the heavily stressed overlying line subsequently wound upon the drum. It is an object to provide means to guard such anchorages against injury under such circumstances, without adding appreciably to the bulk of the reeled-in line, nor interfering with hauling in or setting operations.

Other objects will appear as this specification proceeds, and need not be set forth here in detail.

The invention is shown in the accompanying drawings in alternative forms, and such forms will be claimed generically and specifically.

FIGURE 1 is an isometric view, partly broken away, showing the general character of a net such as would employ the float of this invention.

FIGURE 2 is a similar view, to a larger scale, showing how weights of a particular kind, shown in my pending application Serial No. 834,032, filed August 17, 1959, now Patent No. 3,076,283, dated February 5, 1963, cause the lower edge of a bottom trawl net curtain to ride over the bottom during use, yet maintain such edge close to the bottom during such use.

FIGURE 3 is an exploded isometric view of a float of this invention, from below, illustrating its interior construction, and FIGURE 4 is a similar view, from above.

FIGURE 5 is a transverse sectional view of a float such as is shown in FIGURES 3 and 4, and incorporating a quick-release device such as is the subject of one phase of this invention; and FIGURE 6 is a side elevational view of the same, partly broken away.

FIGURE 7 is an underside isometric view of such a float, detached from its line.

FIGURE 8 is a front elevational view of the same float, shown attached to its line, and in position of use, wherein it produces a lateral catenary-countering force.

FIGURE 9 is a detail, partly in section, illustrating a part of the mechanism for releasing the float from its anchorage to the line.

FIGURE 10 is an isometric view illustrating the semi-permanent securement of an anchorage line, to which the float is detachably securable, to a principal line of the net, such as a sweep line.

FIGURE 11 is an isometric view of the first stage of securing the anchorage line to the principal line, and FIGURE 12 is another isometric view of the same from a different viewpoint, and with the pricipal line omitted.

FIGURE 13 is a view similar to FIGURE 10, showing the next-to-final stage in the assembly.

FIGURE 14 illustrates the final stage, the anchoring collar being shown in section lengthwise of the principal line.

FIGURE 15 is a view similar to FIGURE 10, but illustrating an alternative securement of a float anchorage line, detachable with the float, to the principal line.

FIGURE 16 is an exploded isometric view, illustrating the alternative securement.

FIGURE 17 is an isometric view of the alternative securement, in a further stage of completion.

FIGURE 18 is in part an elevational view and in part a sectional view lengthwise of the principal line, showing the completed anchorage.

FIGURE 19 is a transverse sectional view through the completed anchorage, at line 19—19 of FIGURE 18.

FIGURE 20 is a view similar to FIGURE 8, but showing the alternative form of anchorage.

FIGURES 1 and 2 illustrate the general characteristics of a typical net to which the float of this invention is attached. A large cod end 9, with its funnel 90 opening forwardly from its open forward end, is preceded by forwardly divergent curtains 91 suspended from curtain lines 92 that are anchored at their forward ends to doors (not shown) which are dragged forwardly by towing warps trailing behind the trawler. The function of the doors is to spread the forward ends of the curtains widely apart, to guide bottom fish into the funnel and cod end of the net. The lower edge of the curtains drags over the bottom, being held down by the water reacting weights 93 of rubber or other material, which are distributed along the bottom edge of the curtains. The net proper (funnel and cod end) is dragged by sweep lines 94 which extend aft from the respective doors to connectors 95, and the drag is transmitted to the cod end 9 through mesh suspenders 96. The lower bosom of the net is defined and supported off the bottom by bobbins 97 which roll over the bottom. The sweep lines 94 are supported off the bottom by floats 1. Similar floats 1a may support the curtain lines 92 and the upper bosom which joins their after ends, if the lines themselves are not buoyant. The forward portion of the funnel's upper portion is secured to such lines 92 or to a bosom line joining them. It is with these floats 1 or 1a, and with their anchorage to the mesh or to the lines, particularly the sweep lines 94, that this invention is concerned.

The details of construction of a typical float are illustrated in FIGURES 3 to 9. The float is hollow, and as shown includes recessed top and bottom halves or pans 10 and 11, respectively, held together by joining screws 10a or the like. Substantially the entire interior space, including the interior of keel elements 14 and 14a referred to later, is occupied by a light filler 12, such as molded plastic filled with wood chips, the whole coated with a sealing coating of rubber or the like. The portions of filler 12 which extend into the interior of keel elements 14 and 14a are designated 12a, 12b, respectively, in FIG. 3. This filler 12 is inherently buoyant to some degree (as is the float as a whole) but its primary function is to resist crushing of the float 1, particularly by hydrostatic pressures. The principal upward or buoying force is produced by water reacting against external water reaction surfaces such as 13 when the float is drawn forwardly in use. It will be evident that this buoyant force can only be produced when the float is properly oriented to present its water reaction surfaces, such as 13, in the intended manner to the water as the float moves forwardly. This orientation is maintained by a keel 14, designated the principal keel to distinguish it from auxiliary keel-like elements 14a. The keel 14 is located approximately midway between the lateral edges of the float, running the full length of the latter, and the auxiliary keels 14a are at the opposite sides of the principal keel 14, near the trailing edge of the float. All extend fore and aft, and serve to maintain the advancing float oriented so that its water reaction surface 13, and others, will produce the desired lift.

The point of application of dragging force to the float is located well forwardly on an under side portion of the float, usually along the central keel 14, as illustrated in FIGS. 3 and 5–9, for example. This forward location gives to the water reaction surfaces, as 13, the correct angle of attack. The float 1 is normally attached to the sweep line 94 or curtain line 92, which it buoys up, through an anchorage line 2 that is anchored at one end to the curtain line or to the sweep line, and at its other end to the float, during use. Such anchorage lines may be short (in the case of curtain or curtain line floats) or longer (in the case of sweep line floats). In the following description the floats and anchorage lines for the sweep lines will be described, the description except for the length of anchorage line being equally applicable to floats and anchorage lines for other elements of the net.

As the principal line—the sweep line 94 for instance—is being hauled in, the floats must be detached therefrom, for the stress of the lines hauling in a loaded cod end, wrapped about floats previously reeled onto the drum, would tend to crush these floats and/or damage the lines. For such reasons it is quite important that the floats be removed as the net is being hauled and replaced as the net is being set. This is feasible because of the use of a quick-detachable securement, because hauling or paying out proceeds at a walking pace.

It is largely immaterial whether the release for the float be at the point where the anchorage line 2 is anchored to the principal line 94, or at the outer free or float end of the anchorage line. There are advantages in each such location. In the form shown in FIGURES 5 to 14 the release is at the free end of the anchorage line, and the latter remains attached to the principal line, whereas in the alternative form of FIGURES 15 to 20 the release is at the principal line.

Describing first the form shown in FIGURES 5 to 14, the principal keel 14 is notched at 14b, near its forward end, and a closed eye 20 on the free end of the anchorage line 2 is received in that notch. A locking bolt 15 is slidably guided in the keel 14, and is urged by a spring 15a in the sense to span the notch 14b, and so, when passed through the eye 20, to secure the float 1 to the line 2. A pin 15b upstanding within a slot 14c in the keel 14, and protected by the keel against accidental release, can be engaged by a finger to withdraw the bolt 15 for release or re-engagement of the eye 20.

The opposite or inner end of the anchorage line 2 remains alway attached to the principal line 94, unless replacement is required. This semi-permanent attachment includes a collar 21 encircling the line 94 and crimped or swaged thereabout, but which was initially of U-shape, as shown in FIGURES 11 and 12. This collar is formed with a recess shouldered at 21a, adjacent the cable 94, and with a groove 21b of a size to fit closely about the anchorage line 2. Grooves 21c facilitate its crimping about the line 94. The line 2 has a head 22 of a size to fill the recess in the collar and to seat upon its shoulder 21a, swaged onto its end. A set screw 23 in the collar 21 engages the head 22 and prevents its backing out. When the collar has been applied to the line 94, with the head 22 properly secured within its recess, the anchorage line 2 is retained attached to the line 94 at all times, and the float can be detached from the eye 20. If it is ever necessary to remove collar 21, it can be ground off at the line of the groove 21b, and there is no danger of injuring the principal line 94 by contact of the grinding wheel with the line 94.

The form shown in FIGURES 15 to 20 locates the release at the inner end of anchorage line 2, where it is slightly more convenient for location by a crew member feeling along the incoming or outgoing line 94. Here the collar 24 is formed of two halves, pivotally connected to enclose the line 94, and held closed about the line by a saddle 25 secured by screws 25a. An eye 26 stands up from the collar or from the saddle, and a snap hook 27 upon the inner end of the anchorage line 2 engages therewith. The outer end of the line 2 may be permanently secured to the float 1.

The collar 24 is not so secured to the line 94 as to insure against slippage therealong nor against rotation thereabout (which latter is desirable so that the line is never wrapped about the line 94, but always trends upwardly) and the collar and its eye 26 and saddle 25 would be somewhat liable to deformation unless protected. Both such undesirable contingencies are guarded against by swaging protective collars 94a or 94b onto the line 94, at spacings to receive the rotative collars 24 between them, and of sufficient diameter to protect the same from likelihood of damage. As shown by FIGS. 15–17, protective collars 94a decrease in diameter as they extend away from collar 24 whereat their diameter is the largest. Protective collars 94b are shown (FIG. 18) as being in the form of open-centered spheroids.

As the net is being hauled and wound upon a drum, the line 94 assumes a large part of the stress. It comes in sufficiently slowly that a crew member can disengage the bolt 15 or the snap hook 27, and release the float (and in the latter case the anchorage line 2 also) from the line 94. The collar 21 is of slight bulk, and of sufficiently rugged construction that it will not be crushed nor deformed by succeeding wraps of line 94 about the drum. The collar 24, while of less rugged construction is well protected by the protective collars 94a (FIGS. 15–17) or 94b (FIG. 18), although if it is damaged it can easily be replaced. When the net is to be set again, the points of securement, at 20 or at 26, are readily seen or felt by a crew member, who attaches a float at each such location, while the line is running out. It is never necessary to halt the line. As clearly shown in FIG. 18, for example (in connection with collars 94b), the protective collars may be made to have a radius at least equal to the greatest radial extent of the connector member or collar 24.

In the water the floats are protected against hydrostatic crushing by the light-weight filler 12. If such a filler, or any part of the float is damaged, the float is easily taken apart and the damaged part replaced.

It will be noted in FIGURES 3, 4, and 5, that the pans 10 and 11 are shown as weighted along one of the side edges, as indicated at 19a and 19b, respectively, whereas the opposite side edges 18a and 18b are not weighted. Obviously only one of the edges 19a or 19b might be weighted, and the degree of extra weight so provided might vary in different floats. The object of so weighting the float is to cause the water reaction surfaces, such as 13, to tilt laterally as the float is drawn through the water, rather than to remain level laterally. By tilting it, as shown in FIGURES 8 and 20, the float in use produces not only a strong upward force component, but a lateral force component as well, which has the effect of countering the tendency of the line 94 to assume a catenary curve, as explained in my application Serial No. 150,577.

From the foregoing, further variations, adaptations, and modifications of releasable floats for trawl nets and various arrangements thereof can be evolved by those skilled in the art to which the present invention is addressed, within the scope of the following claims.

I claim as my invention:

1. A trawl net float comprising complemental components defining a hollow body, and externally formed with water reaction surfaces which in use produce an upward force component, and a weight mass integral with at least one of said components and located along one side of said body, and of greater value than the inherent weight mass on the opposite side, to produce in use a lateral force component.

2. In combination, a line for a fishing net, a connector element of a generally annular form loosely encircling an intermediate portion of said line, for rotation thereabout, said connector element including an eye and a pair of protective collars secured to the line, one on each side of said connector element, and each of a radius at least equal to the greatest radial extent of said generally annular connector element, so as to afford protection to the connector element from crushing during handling of the line.

3. In combination, a principal line, a float which in use is buoyant disposed generally above said principal line, and means attaching said float to the principal line comprising an anchorage line secured at one end to said float, a stop member affixed to the end of said anchorage line distal the float, and a collar affixed to the principal line, said collar being formed with a recess extending adjacent and parallel to the principal line, said recess terminating intermediate the length of said collar as a transverse shoulder, said collar also being formed with a groove extending axially beyond said recess, said stop member on the anchorage line being configured to snugly fit in said recess and including a shoulder complemental to and engaging the shoulder of the recess, with the portion of said anchorage line that is adjacent to said stop member being engaged by the said groove in said collar, and means to maintain the stop member and the adjacent portion of the anchorage line in the recess and groove, respectively, of the collar.

References Cited by the Examiner

UNITED STATES PATENTS

| 240,611 | 4/1881 | Redfield | 43—43.1 |
| 739,655 | 9/1903 | Detwiler | 24—230.1 |
| 1,467,116 | 9/1923 | Reekers | 43—42.19 |
| 2,033,701 | 3/1936 | Gibbs. | |
| 2,103,222 | 12/1939 | Nelson | 43—43.1 |
| 2,494,620 | 1/1950 | Johnson. | |
| 3,013,356 | 12/1961 | Luketa | 43—9 |

FOREIGN PATENTS

| 16,564 | 1914 | Great Britain. |
| 690,084 | 4/1953 | Great Britain. |
| 849,701 | 9/1960 | Great Britain. |
| 87,180 | 4/1956 | Norway. |

ABRAHAM G. STONE, *Primary Examiner.*

F. RAY CHAPPELL, *Examiner.*